(12) United States Patent
Liao et al.

(10) Patent No.: US 6,570,556 B1
(45) Date of Patent: May 27, 2003

(54) POINTING STICK DEVICE AND THE MANUFACTURING METHOD THEREOF

(75) Inventors: Pin-Chien Liao; Ta Yuan Lee, both of Taoyuan (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 09/425,106

(22) Filed: Oct. 13, 1999

(30) Foreign Application Priority Data

Jan. 8, 1999 (TW) ........................................ 88100211 A

(51) Int. Cl.[7] ................................................ G09G 5/00
(52) U.S. Cl. .................... 345/161; 345/157; 74/471 XY
(58) Field of Search ................. 345/156–169; 463/37, 38; 399/302, 308; 430/126, 256; 273/148 B; 74/471 XY

(56) References Cited

U.S. PATENT DOCUMENTS

| | | | |
|---|---|---|---|
| 5,521,596 A | | 5/1996 | Selker et al. ................ 345/161 |
| 5,640,178 A | * | 6/1997 | Endo et al. .................. 345/161 |
| 5,732,314 A | * | 3/1998 | Tsukida et al. ............. 399/302 |
| 5,748,180 A | * | 5/1998 | Inukai ......................... 345/161 |
| 5,754,167 A | * | 5/1998 | Narusawa et al. .......... 345/161 |
| 6,002,388 A | * | 12/1999 | Seffernick et al. .......... 345/161 |
| 6,183,933 B1 | * | 2/2001 | Ishikawa et al. ............ 430/256 |

FOREIGN PATENT DOCUMENTS

| | | |
|---|---|---|
| JP | 6-207865 | 7/1994 |
| JP | 8-124811 | 5/1996 |
| JP | 10-057884 | 3/1998 |

\* cited by examiner

*Primary Examiner*—Lun-Yi Lao
(74) *Attorney, Agent, or Firm*—Birch, Stewart, Kolasch & Birch, LLP

(57) ABSTRACT

A pointing stick used to control the cursor's movement on a display device is provided. The pointing stick includes a substrate and a stick. The stick has one end connected to the substrate and a portion of the stick is in form of cylinder. A plurality of sensors are disposed over the circular surface of the cylinder of the stick.

13 Claims, 6 Drawing Sheets

POINTING STICK DEVICE AND THE MANUFACTURING METHOD THEREOF

FIELD OF INVENTION

The invention relates to a device for controlling the cursor movement on a display device.

BACKGROUND OF INVENTION

The traditional cursor controller, e.g. joystick or mouse, is not suitable for the notebook type computer system due to its size. As shown respectively in FIG. 1(A) and FIG. 1(B), a pointing stick 12 disposed on a keyboard 10 has been widely used in the notebook type computer due to its miniature structure. The state-of-art cursor controller device is disclosed in U.S. Pat. Nos. 5,521,596 and 5,640,178.

The following introduces two types of state-of-art pointing stick. The pointing stick, disclosed in U.S. Pat. No. 5,640,178 and depicted in FIG. 2(A), FIG. 2(B), includes a substrate 21 and a stick 22 connected to the substrate 21. The substrate 21 is made of resilient material. According to the different designs, the substrate 21 may be in form of three or four blades structure. Four blades structure is shown in FIG. 2(A). At the end of each blade, one female screw 211 is provided. Through the male screw 23, the pointing stick is attached to the baseplate 24 of the keyboard (not shown). The sensors 212 are respectively disposed and attached to the bottom of the substrate 21. The resistance of the sensor 212 varies responsive to the deformation of the substrate 21. During operation, by exertion of force onto the tip of the stick 22, the substrate 21 deflects and deforms. The sensor 212 deforms accordingly and a corresponding signal change is received by a controller (not shown). The controller then controls the cursor movement. As a three blades structure of the substrate is adopted, totally three sensors 212 are required.

However, for the above-mentioned pointing stick, the sensors are attached onto the substrate, and the deformation of the substrate is caused by the external force on the stick. Therefore, the substrate's material property must have enough flexibility and the stick's material property must have enough rigidity. These requirement place limitation on the types of material that can be used for the substrate or the stick. Furthermore, since the substrate property requires flexibility, the substrate may be easily damaged by the force exerted from the stick when the horizontal force applied on the stick exceeds a value. On the other hand, a spacing 24A, which is required to allow a vertical displacement of the substrate 21 during operation, would not allow further size reduction of the keyboard.

Another state-of-art pointing stick, shown in FIG. 3, includes a substrate 31 of rigid material and a stick 32 in rectangular column. On each of the four surfaces 321 of the column, one sensor 322 is disposed. The sensor 322 consists of two electrodes 3222, 3223, a strain gauge 3221, and a conductor 3224, which increases the conductivity. One end of the stick 32 is vertically disposed with respect to the substrate 31 and connected to the substrate 31 using a conventional approach. For instance, a female screw 311 and a corresponding male screw (not shown) may be used. The resistance of the sensor 322 varies responsive to the deflection of the stick 32. During operation, by exertion of a force onto the tip of the stick 32, the strain gauge 3221 deforms accordingly and a corresponding signal change is received by a controller (not shown). The controller then controls the cursor movement.

The rigid material of the substrate of the second type pointing stick mentioned above increases the strength of the substrate 31. The substrate 31 does not deforms during operation. Through this implementation, the substrate 31 may be attached to the keyboard baseplate without requiring a spacing, which is required for the pointing stick shown in FIG. 2(B). However, since the stick is in form of a rectangular column, four sensors are required. In addition, the sensor on each surface need one print process to make, and totally four print processes are needed to form the sensors on the. rectangular column. The corresponding print process is tedious and is not cost effective. As a result, the cost for the pointing stick of the second type can not be lowered.

SUMMARY OF INVENTION

A pointing stick for use to control the cursor movement on a display device is provided.

The pointing stick includes a substrate, a stick and a plurality of sensors.

One end of the pointing stick is connected to the substrate and a portion of the stick is in form of a cylinder.

The plurality of sensors are disposed over a circular surface corresponding to the cylinder of the stick.

BRIEF DESCRIPTIONS OF APPENDED DRAWINGS

Figures 1A, 1B:
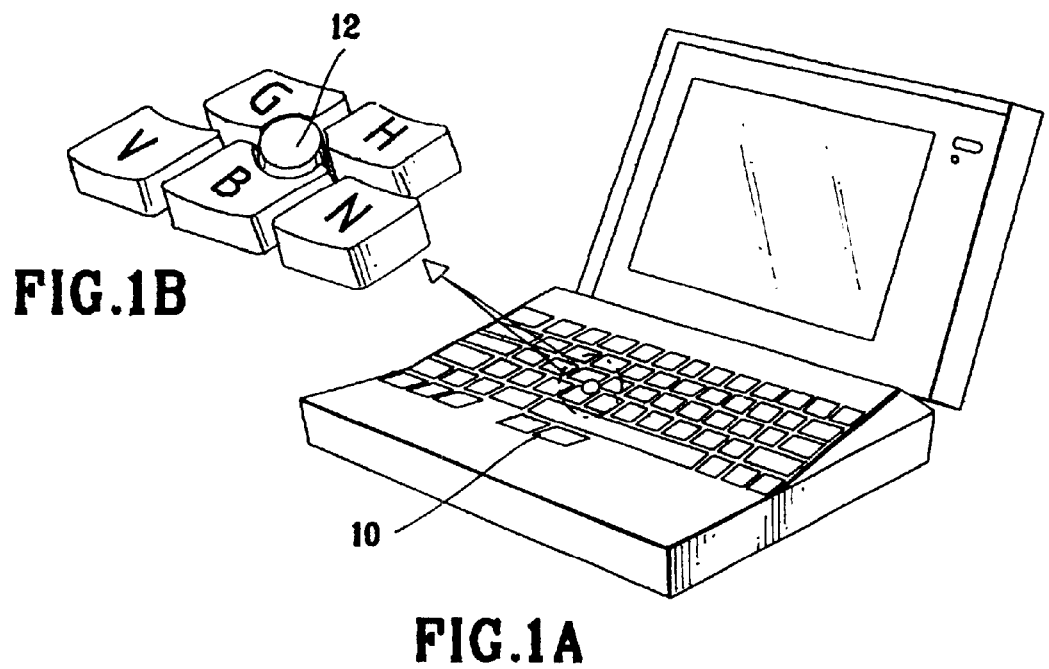
FIG. 1(A) shows a keyboard incorporating a pointing stick.
FIG. 1(B) shows a partial enlargement view of FIG. 1(A).
Figure 2A:
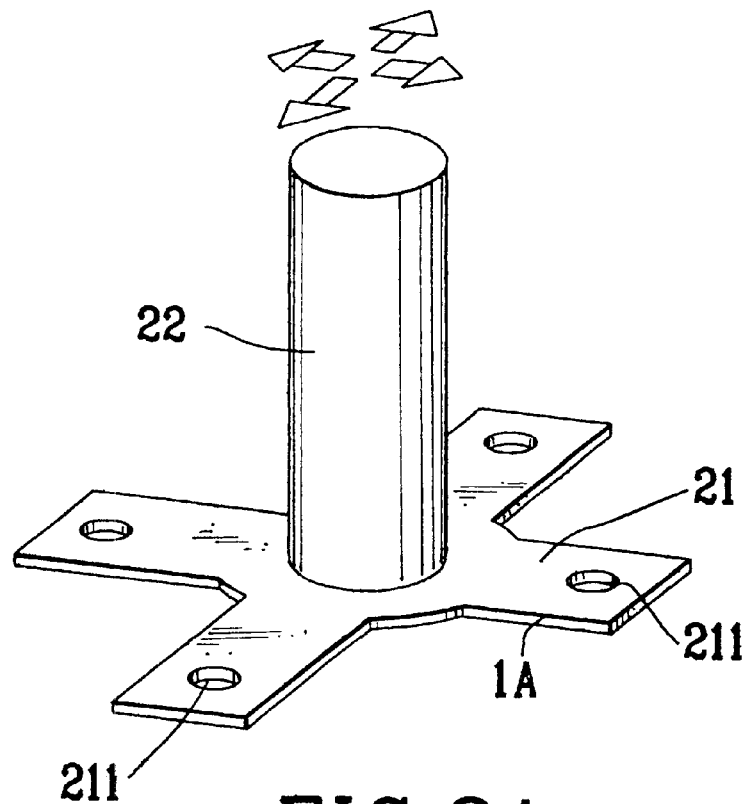

FIG. 2(A) discloses one prior art pointing stick.

Figure 2B:
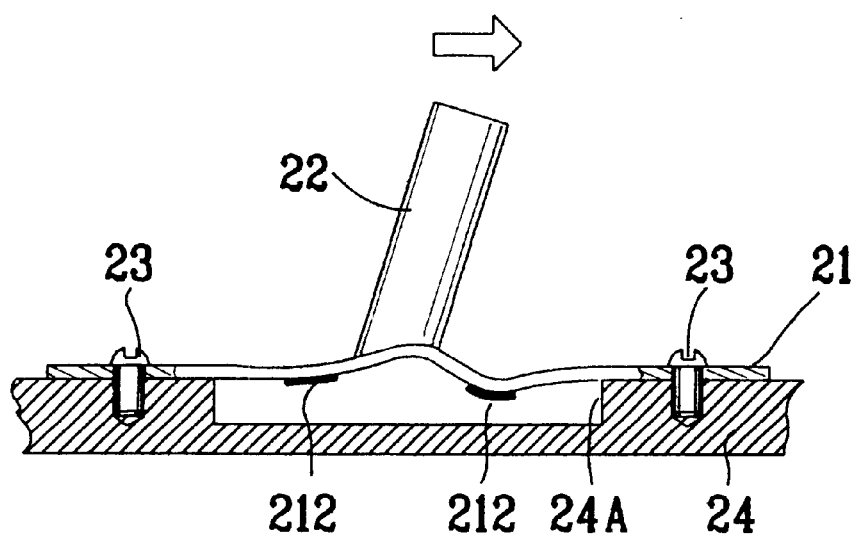

FIG. 2(B) discloses the sectional view of the pointing stick of FIG. 2(A) when assembled to the baseplate of the keyboard.

Figure 3:
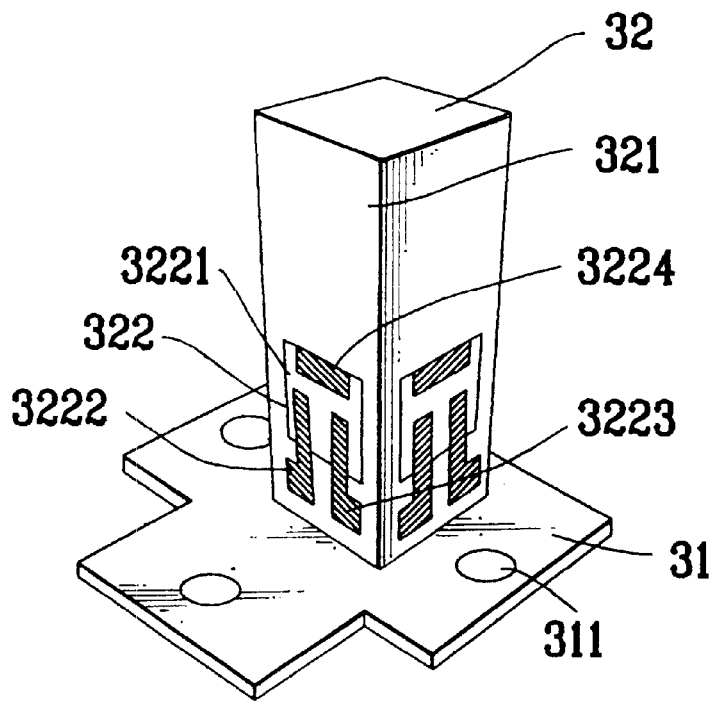

FIG. 3 discloses another prior art pointing stick.

Figure 4:
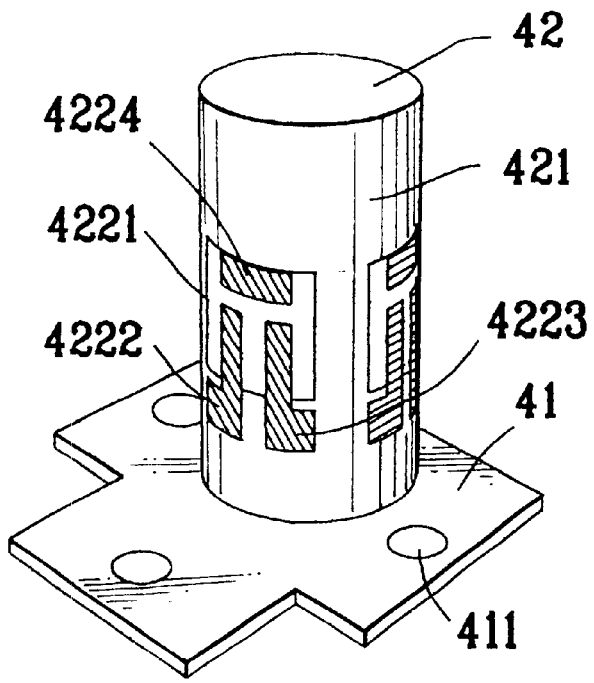

FIG. 4 discloses a pointing stick in accordance with the invention.

Figure 5:
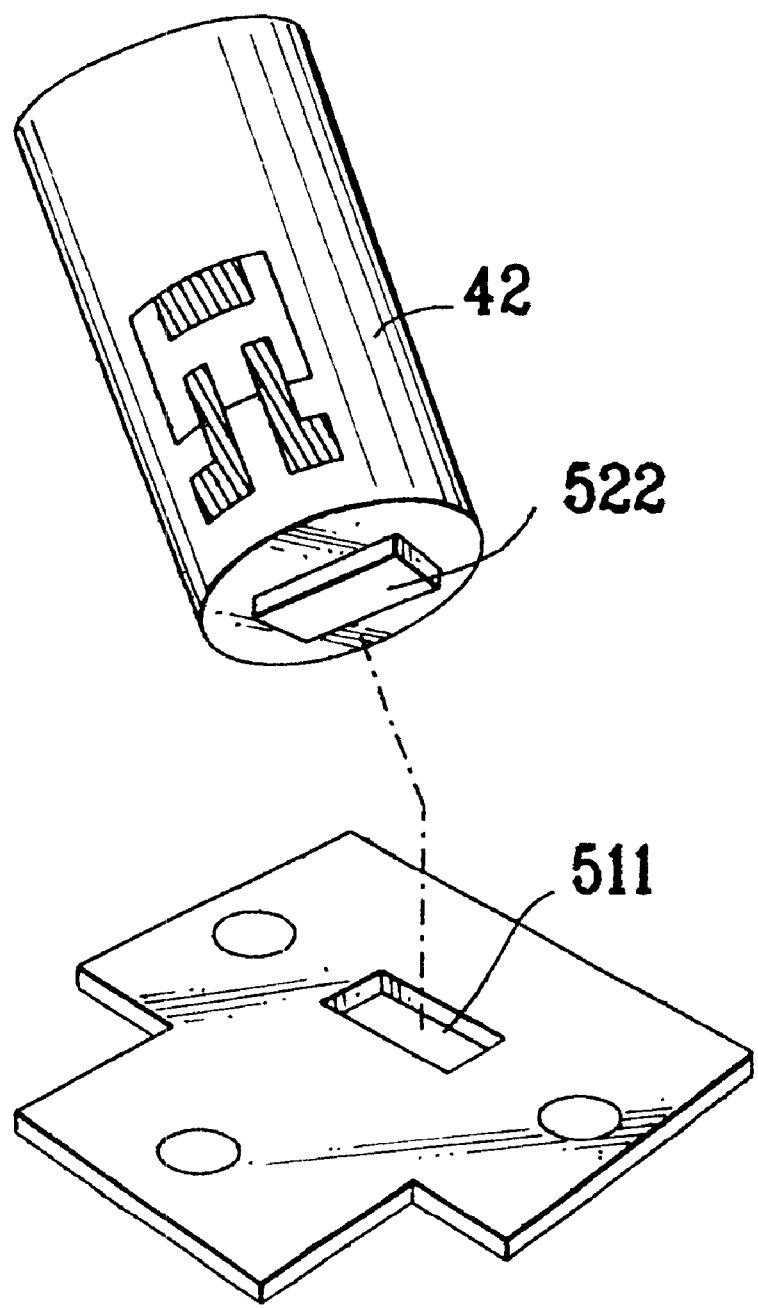

FIG. 5 discloses the pointing stick before assembly in accordance with the invention.

Figure 6:
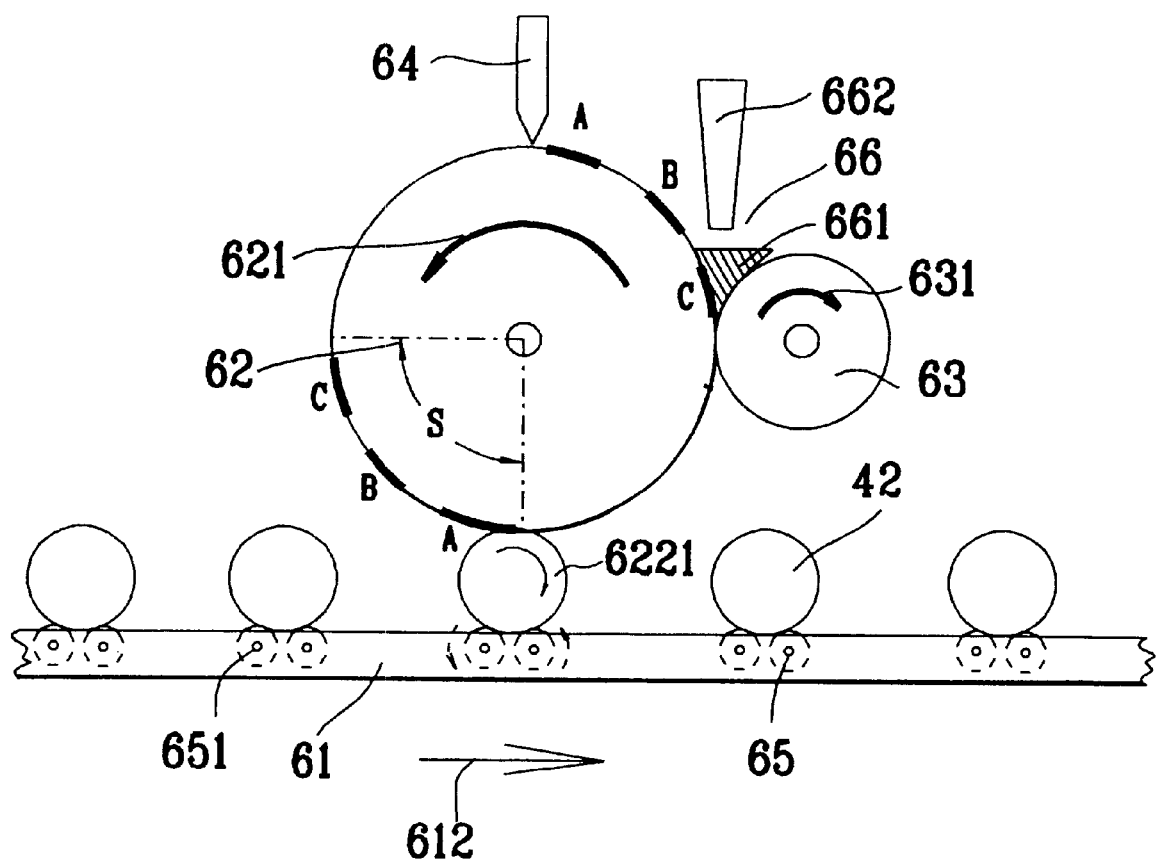

FIG. 6 discloses the first embodiment of the apparatus used to transfer print a sensor onto the pointing stick of the invention.

Figure 7:
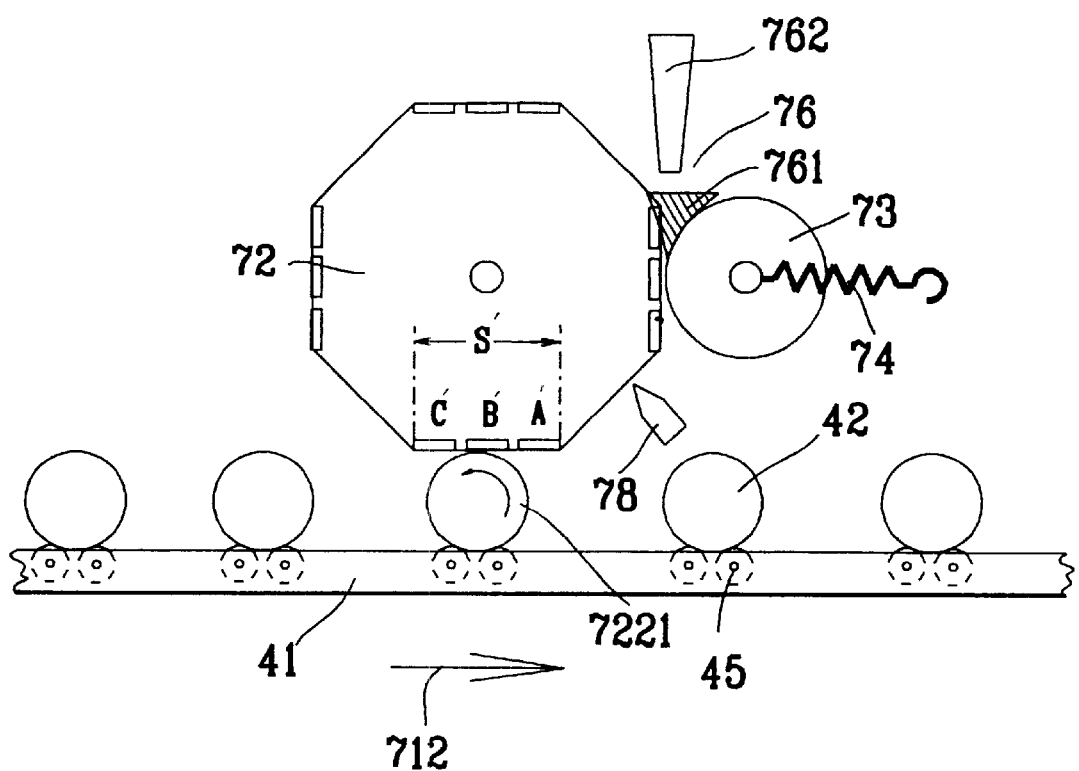

FIG. 7 discloses the second embodiment of the apparatus used to transfer print a sensor onto the pointing stick of the invention.

DETAILED DESCRIPTIONS OF THE INVENTION

The pointing stick of the invention, as shown in FIG. 4, includes a substrate 41 and a stick 42. The stick 42 includes a circular column, i.e. a cylinder. Due to the cylinder form of the pointing stick, the sensors on the circular surface of the cylinder may be easily formed by a transfer print process, which is recited hereinafter.

Based on the assembly requirement, the substrate 41 may be in a corresponding suitable shape. We use a T-shaped substrate in the following as an embodiment. In order to assemble the substrate 41 to the keyboard baseplate (not shown), multiple of female screws 411 are provided. A plurality of sensors 422 are formed over the circular surface of the stick 42. As a preferred embodiment, three sensors 422 are used and each sensor 422 is spaced from another adjacent sensor by 120 degrees. The sensor 422 consists of two electrodes 4222, 4223, a strain gauge 4221 and a conductor 4224, which increases the conductivity. One end of the stick 42 is vertically disposed with respect to the substrate 41 and connected to the substrate 41 using a conventional approach.

In an alternative embodiment, the stick may include a portion of cylinder and the rest portion is in form of other cross-section type. For instance, a rectangular cross-section type. Nevertheless, sensors are still disposed over the circular surface of the cylinder portion.

As shown in FIG. 5, the stick 42 may be an element separate from the substrate 41 and connected to the substrate 41 through engagement of the hole 511 and the corresponding positioning projection 522. Alternatively, the pointing stick may also be formed integrally to include the stick 42 and the substrate 41.

The following introduces the transfer print process of the sensors on the circular surface of the cylinder portion of the stick.

As shown in FIG. 6, the transfer print apparatus includes a conveyer 61 which includes a plurality of carriers to carry the stick. Each carrier consists of a pair of cylinders 65. The cylinder 65 is rotatably connected to the conveyer 61 through its axle 651. A spring device (not shown) is provided to exert a suitable upward force to the cylinder 65. The stick 42 is disposed onto and between the cylinders 65. The conveyer 61 moves forward as indicated by the arrow sign 612. The transfer material spread set includes the transfer roller 62, the roller 63, the inject device 662 and squeegee 64. The surface on the transfer roller 62 includes a predetermined plurality of transfer patterns. The patterns may be pattern for transfer printing the electrode or pattern for transfer printing the strain gauge. The pattern may be in form of relief type or intaglio type. The number of set of pattern depends on and corresponds to the number of sensors to be printed. In the figure, pattern A corresponds to one sensor formed on the circular surface of the stick. And pattern B corresponds to another sensor formed on the circular surface of the stick, etc. The distance S corresponds to the circumference of the stick 42. The roller 63 presses against the surface of the transfer roller 62 by a spring device (not shown). As the roller 63 rotates clockwise, the roller 63 drives the transfer roller 62 counterclockwise accordingly. The roller 63 further acts to stir up the transfer material 661 saved in the reservoir 66 formed by the surfaces of the roller 63 and the transfer roller 62. Through the inject device 662, the transfer material 661 is injected into the reservoir 66. As the transfer roller 62 rotates, the transfer material 661 is fed into the intaglio-type pattern or relief-type pattern. The residual transfer materials left on the other portion of transfer roller 42 are cleaned up by the squeegee 64.

The following summarizes the detailed steps.

(1) The conveyer 61 carries the sticks 42 and moves in a direction indicated by the arrow sign 612.

(2) As one stick 42 moves to a location right under the vertical center line of the transfer roller 62, through a force exerted by the cylinders 65, the stick 42 presses against the transfer roller 62, and the conveyer 61 pauses. This location is named as the print station.

(3) At the print station, the transfer roller 62 rotates in a direction indicated by the arrow sign 621 and drives the stick 42 rotate in a direction indicated by the arrow sign 6221. As a result, the transfer material 661 adhered to the patterns A, B, and C are sequentially transfer printed onto the circular surface of the stick 42.

(4) As the transfer print over the stick 42 is complete, the conveyer 61 moves forward and conveys the post-print stick away from the print station.

(5) The conveyer 61 keeps moving and transports the pre-print stick 42 to the print station. As the pre-print stick 42 reaches the print station, the conveyer 61 pauses again and processes mentioned in step (3) and (4) are performed.

As a result, a serial of sticks 42 are conveyed by the conveyer 61 and the transfer print processes are performed on the circular surface of the sticks by a predetermined sequence as mentioned above.

As shown in FIG. 7, which discloses the second embodiment of the transfer print apparatus, the transfer roller 72 is a column which has cross-section in polygon shape. As a preferred embodiment, the octagon shape is chosen. That is, the column of transfer roller 72 includes 8 flat surfaces and a predetermined four sets of patterns are provided. As shown, two nearby sets of pattern are spaced from each other by a flat surface of the octagon column, which does not have the pattern. The transfer material spread set includes a transfer roller 72, a roller 73, an inject device 762 and a squeegee 78. The roller 73 presses against the surface of the transfer roller 72 by a spring device 74. A reservoir 76 is formed between the transfer roller 72 and the roller 73. The transfer material 761 is injected into the reservoir 76 by the inject device 762. The residual transfer materials left on the other portion of transfer roller 72 are cleaned up by the squeegee 78.

The following summarizes the detailed steps.

(1) The transfer roller 72 rotates clockwise and one flat surface provided with the pattern A', B' and C' passes the reservoir area 76. The patterns A', B' and C' on the flat surface are adhered with the transfer material 761. After the cleanup procedure by the squeegee 78, the transfer roller 72 reaches and stops at a print station at which the flat surface with patterns having transfer materials is substantially parallel to the motion path of the conveyer 41.

(2) The conveyer 61 carries a plurality of sticks 42 and moves forward as indicated by the arrow sign 712.

(3) As one pre-print stick 42 reaches a location at which the stick 42 begins to contact with the pattern C', the transfer print process begins. During the transfer print process, the conveyer 41 moves in a predetermined speed, and the stick 42 presses against the transfer roller 72 and rotates as indicated by arrow sign 7221. As the stick 42 leaves the print station, the print material has been transfer printed on the circular surface of the stick 42 according to the pattern A', B', and C'.

(4) Transport the post-print stick 42 away from the print station.

(5) Rotate the transfer roller 72 such that the next set of patterns adhered with the transfer materials faces toward the stick 42 as recited in step (1).

(6) Repeat the steps (2), (3), (4) and (5).

As shown in FIG. 4, the sensor includes two electrodes 4222, 4223, the strain gauge 4221 and the conductor 4224. The same material is used to form the two electrodes 4222, 4223, and the conductor 4224, and they are disposed in the same layer. The strain gauge 4221 is coated over the layer of two electrodes 4222, 4223, and the conductor 4224. As a result, the sensor may be formed through two passes of the transfer print recited below.

(1) Prepare a transfer roller which has patterns corresponding to the two electrodes 4222, 4223, and conductor 4224. Implement the transfer roller into the transfer print apparatus either shown in FIG. 6 or 7 and perform corresponding transfer print process recited above. After the process, the conduction material then are coated on the circular surface of the stick 42 to form the two electrodes 4222, 4223, and conductor 4224.

(2) The oven-curing and sinter of the stick 42 obtained through step (1) is performed.

(3) Prepare a transfer roller which has patterns corresponding to the strain gauge 4221. Implement the transfer roller into the transfer print apparatus either shown in FIG. 6 or 7 and perform corresponding transfer print process recited above. After the process, the strain gauge material then are coated on the circular surface of the stick 42 to form the strain gauges 4221.

(4) The oven-curing and sinter of the stick 42 obtained through step (3) is performed.

What is claimed is:

1. A method for manufacturing sensors over a pointing stick, the pointing stick including a cylinder, a plurality of sensors being disposed over a predetermined location on a circular surface corresponding to the cylinder, each sensor including a plurality of layers of membrane at least one of which is formed thereon by a transfer print method, each membrane layer corresponding to a transfer material, the method comprising:

(a) providing a transfer roller, the transfer roller having a transfer surface which includes a predetermined transfer pattern, the transfer pattern being adhered with said transfer material;

(b) pressing the circular surface of the cylinder against the transfer surface of the roller;

(c) rotating said transfer roller and said stick such that the transfer material adhered with the transfer pattern is transferred to the predetermined location on the circular surface.

2. The method of claim 1, wherein the step (a) includes a step of providing a squeegee device for cleaning up residual transfer material on the transfer surface.

3. The method of claim 1, wherein the step (a) includes a step of providing a conveyer to convey said stick.

4. The method of claim 3, the conveyer comprising a carrier to carry said stick.

5. The method of claim 1, wherein the step (a) includes a step of providing a roller, said roller pressing against said transfer roller and driving said transfer roller.

6. The method of claim 5, wherein the step (a) includes a step of providing an inject device for injecting the transfer material into a reservoir formed by the roller and the transfer roller.

7. A method for manufacturing sensors over a pointing stick, the pointing stick including a cylinder, a plurality of sensors being disposed over a predetermined location on a circular surface corresponding to the cylinder, each sensor including a plurality of layers of membrane at least one of which is formed thereon by a transfer print method, each membrane layer corresponding to a transfer material, the method comprising:

(a) providing a transfer surface, the transfer surface including a predetermined transfer pattern, the transfer pattern being adhered with said transfer material;

(b) pressing the circular surface of the cylinder against one end of the transfer surface;

(c) moving the stick forwardly such that the stick rotates with respect to the transfer surface and the transfer material adhered with the transfer pattern is transferred to the predetermined location on the circular surface.

8. The method of claim 7, the transfer surface is a side surface of a polygon-shaped transfer roller.

9. The method of claim 7, wherein the step (a) includes a step of providing a conveyer to convey said stick.

10. The method of claim 9, the conveyer comprising a carrier to carry said stick.

11. The method of claim 10, wherein the step (a) includes a step of providing a roller, said roller pressing against said transfer roller.

12. The method of claim 10, wherein the step (a) includes a step of providing a squeegee device for cleaning up residual transfer material on the transfer surface.

13. The method of claim 12, wherein the step (a) includes a step of providing an inject device for injecting the transfer material into a reservoir formed by the roller and the transfer roller.

* * * * *